March 17, 1931.　　　　O. A. ROSS　　　　1,796,725
FOCUSING FINDER
Filed May 21, 1927
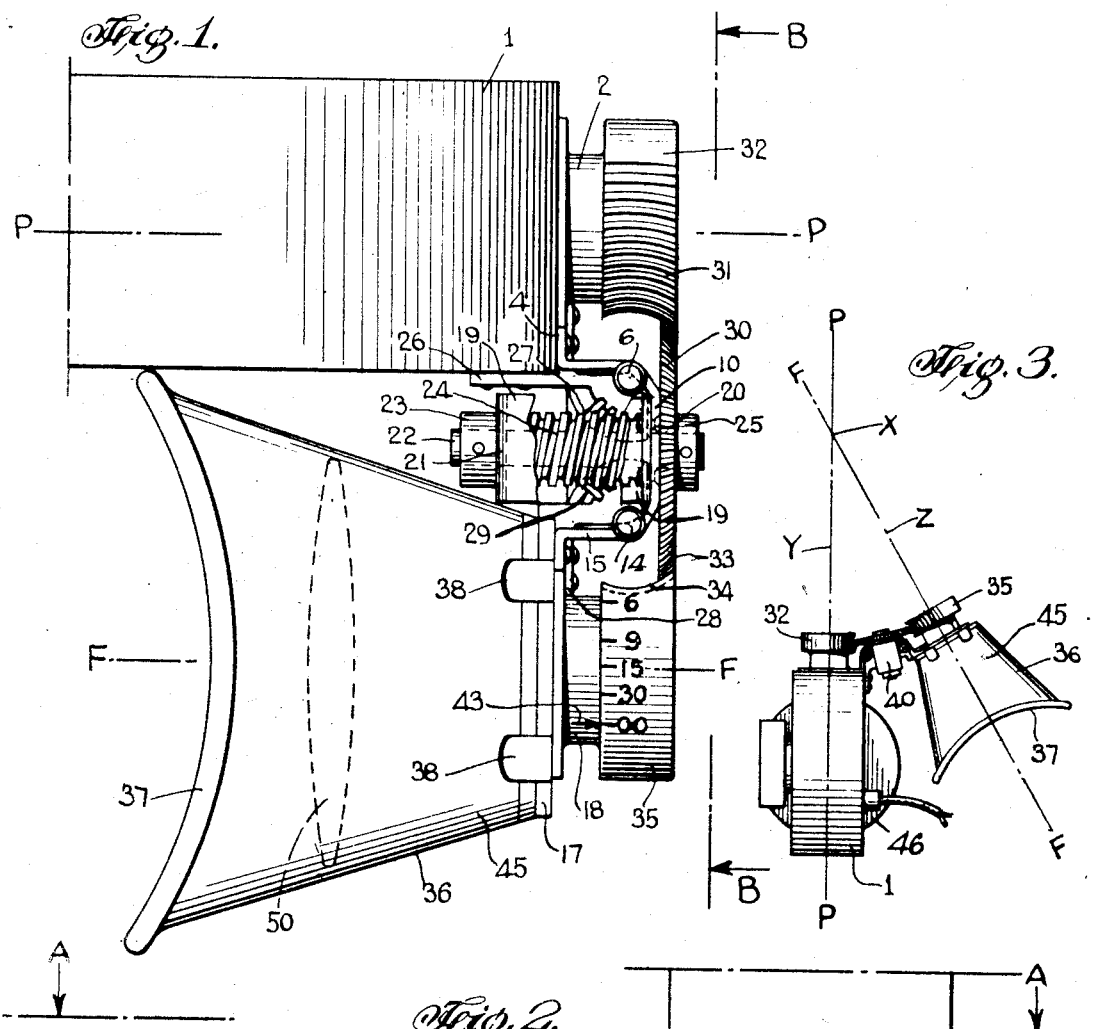
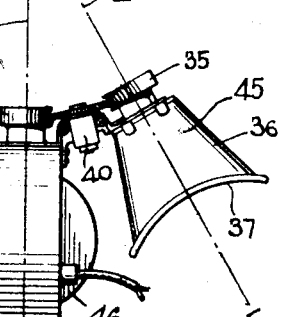
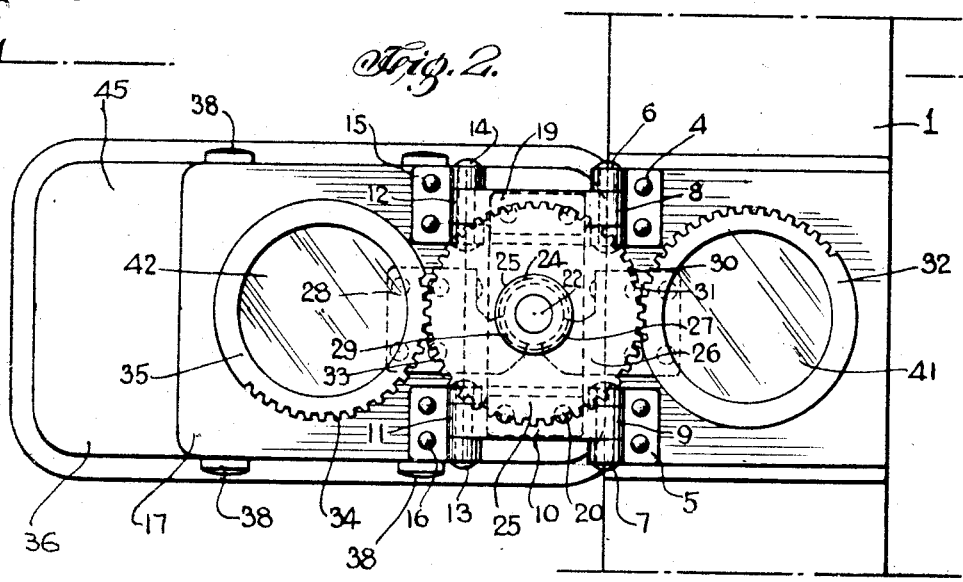
INVENTOR
Oscar A. Ross.

Patented Mar. 17, 1931

1,796,725

UNITED STATES PATENT OFFICE

OSCAR A. ROSS, OF NEW YORK, N. Y.

FOCUSING FINDER

Application filed May 21, 1927. Serial No. 193,220.

This invention relates to focusing finders and more particularly to that class employed for motion picture cameras.

Whereas this improvement may be associated with any motion picture camera, it has been preferably shown as applied to what is known as the Akeley Camera and provides means whereby a motion picture photographer may, if desired, simultaneously photograph, focus and observe the field being photographed, the delineation of the field or frame in the finder being substantially identical to the delineation of the "frame" being photographically impressed on the motion picture film at the photographing aperature in the camera.

Other objects and advantages will appear as the description of the invention progresses, and the novel features of the invention will be pointed out in the appended claims.

This invention consists in the novel construction and arrangement of parts hereinafter described, delineated in the accompanying drawings, and particularly pointed out in that portion of the instrument wherein patentable novelty is claimed for certain and peculiar features of the invention, it being understood that, within the scope of what hereinafter thus is claimed, divers changes in the form, proportions, size and minor details of the device may be made without departing from the spirit of, or sacrificing any of the details of the invention.

In describing the invention in detail, reference is had to the accompanying drawings wherein I have illustrated embodiments of my invention, and wherein like characters of reference designate corresponding parts through the several views, and in which:—

Figure 1, is a top elevational view of one embodiment of the invention showing the focus finder as applied to a motion picture camera and is taken on line A—A of Figure 2, and, Figure 2 is a front plan view of the same taken on line B—B of Figure 1, and Figure 3, is a reduced top plan view illustrating the application of the invention.

Referring to Figures 1 and 2, to camera 1, adjustably mounted on tripod head, or camera mount 46, of known form, having lens mounting 2, are suitably secured hinge brackets 4 and 5, and hinged to which by trunnions 6 and 7 is hinge members 8 and 9 of gear plate 10, said plate also having hinge members 11 and 12 hinged to, by trunnions 13 and 14, to hinge brackets 15 and 16, suitably secured to finder lens bracket 17 supporting finder lens mounting 18.

Secured to gear plate 10 by screws 20—20 is U shaped bearing bracket 19, having a hole 21, acting as a bearing for the rear end of gear and worm shaft 22 secured to which are, collar 23, worm 24 and gear 25.

Suitably secured to camera 1, is bevel gear sector 26, having teeth 27 adapted to mesh with worm 24, and suitably secured to finder lens bracket 17, is bevel gear sector 28 having teeth 29 also meshing with worm 24.

Gear 25 has a gear section 30 meshing with gear section 31 of rotating focusing barrel 32 of the photographing lens 41, and another gear section 33 meshing with a gear section 34 of focusing barrel 35 of the finding lens 42.

View finder, box 36, is preferably of a type as disclosed in Patent Number 1,584,186, issued to George Mitchell on May 11th, 1926, and wherein a "frame" as ordinarily photographed on a motion picture film will be enlarged and corrected to "right side up" when viewed from the viewing frame 37. Said box 36 is preferably allocated by spring clips 38—38 whereby accidental and severe contact with said box will permit its being dislocated without injury to the focus finding mechanism unit 40, this unit comprising all the parts interposed between the hinges 4, 5 and 15, 16, and not supported by the camera 1, or the lens finder bracket 17.

The operation of applicant's improved focus and finding apparatus is as follows:—

With the parts as shown in Figures 1 and 2, the photographing lens 41 and finding lens 42 are adjusted for infinity and the axis F—F of the photographing lens 41 is substantially parallel to the axis F—F of the finding lens 42.

Assume now it is desired to focus on an object six feet from the photographing lens 41. The finder lens barrel 35 is rotated counter-clockwise until the numeral (6) on said barrel registers with the arrow 43 on finder lens mount 18. As said barrel is thusly rotated the gear 25 is caused to rotate clockwise and said gear causes photographing lens barrel 32 to also rotate counter-clockwise to the same numeral (6) thereon, (not shown),—in other words both lenses 41 and 42 are focused to sharply register an image substantially six feet away from the camera.

Simultaneously with the rotation of gear 25, worm 24 is also rotated in this manner, causing said gear to act on sector 26 and cause its movement outwardly, or away from the camera 1, the unit 40 pivoting on trunnions 6 and 7, and, simultaneous with this last-named movement, worm 24 also acts on sector 28 and causes finder lens bracket 17 and all parts secured thereto to pivot on trunnions 13 and 14 and move away from camera 1, and as shown in Figure 3, this movement being preferably proportioned whereby, as the finder lens barrel 35, indicates six feet the finding axis F—F will intersect the photographing axis P—P at X or substantially six feet from camera 1.

From the foregoing, it will be obvious that if a photographer views a magnified field through a view finder section, as 45, (comprising finder hood 36, viewing lens 50, finder lens bracket 17, lens mount 18 and lens 42), and focuses sharply on that field, and the finder lens barrel indicates six feet, not only will the photographing lens 41 be also sharply focused on the same field, but, in addition, the delineation of field of the photographed field will be substantially the same as the delineation of the field seen on viewing lens 50, in the finder section 45.

It is obvious that when ordinarily using applicant's improved focus and finder, that a photographer will view the desired field or "frame" through the view finder section 45 and will adjust the finder lens barrel 35 for sharpness of image and, preferably simultaneously will move camera 1 with respect to the tripod, or camera mount 46 until the field or "frame" seen in view finder 36 is the desired one, thereafter, or simultaneously operating the camera to photographically record the scene of the field, or "frame" on the motion picture film, and that this performance may be accomplished without referring to the distance numerals, as for example, infinity, 30, 15, 9 and 6 appearing on the finder barrel 35.

It is also obvious that, whereas the distance six feet has been employed for purpose of illustration that, any distance may be focused upon and the delineation of field appearing at the viewing lens 50 of the view finder 36 will be the same as that projected by photographing lens 41 on the photographing aperture of camera 1.

Whereas the lens barrels 32 and 35 are shown as not having axial movement, such lens barrels may be employed whereupon the radii of the gear teeth 31 and 34 will be substantially lengthened and their center relocated to a point dependent upon the combined relative axial and circumferential movement of said barrel.

The angular displacement of the axes P—P and F—F is preferably such that for a given angular displacement of said axes the distance of the intersection X from the photographing lens 41 and the finding lens 42 will equal the distance at which images will be made sharp by both said lenses, this distance also corresponding to the particular "distance indicating point" to which the lens barrels have been rotated to obtain the said given angular displacement.

It is to be noted that the intersection X of axes P—P and F—F represents substantially the center of the field or "frame", either viewed in the finder section 45, or projected on the photographic aperture of camera 1.

What I claim is:—

1. In combination with a camera adjustably supported on a tripod head or similar mount, the camera supporting a focusing photographic lens barrel, having a photographic objective therein, of a view-finder unit pivotally supported by the camera independently of the tripod, a focusing finder lens barrel supported thereby having a finder objective therein, and actuating devices supported by the camera and view-finder for simultaneously moving the photographing and finding lens barrels and also simultaneously displacing the finder unit with respect to the camera body whereby the axes of the photographing and finder objectives intersect at the point of sharp focus thereof as the finder objective is focused on a subject to be photographically recorded by the camera.

2. In combination with a camera adjustably supported on a tripod head of similar mounting, the camera supporting a focusing photographic lens barrel having a photographic objective supported therein, of a viewfinder unit, a focusing finder lens barrel supported thereby having a view-finding objective supported therein, a hinge member jointly supported by the camera and the finder unit arranged to pivotally support the finder unit with respect to the camera body, and means supported by the hinge member for actuating the photographing and finding lens barrels simultaneously and also simultaneously pivotally moving the finder unit whereby the axes of the photographing and finding objectives will intersect at the point of sharp focus thereof, as the objectives are focused on a subject to be photographically recorded by the camera.

3. In combination with a camera adjustably supported on a tripod head or similar mount, the camera supporting a focusing photographic lens barrel having a photographic objective therein, of a viewfinder unit, focusing finding lens barrel supported thereby having a view-finding objective therein, a hinge member jointly supported by the camera body and the finder unit arranged to pivotally support the finder unit with respect to the camera body, a gear formed on the photographing lens barrel, a gear formed on the finder lens barrel, an intermediate gear rotatably supported by the hinge member positioned to engage the photographing lens barrel gear and the finder lens barrel gear whereby rotation of one of the lens barrels will simultaneously rotate the other barrel, and actuating devices controlled by the movement of the intermediate gear for angularly displacing the finder unit with respect to the camera body whereby rotation of one of the lens barrels will continuously maintain both of the objectives in focus and the axes thereof will intersect at the point of sharp focus thereof as the objectives are focused on a subject to be photographically recorded by the camera.

4. In combination with a camera adjustably supported on a tripod head or similar mount, the camera supporting a focusing photographic lens barrel having a photographic objective therein, of a viewfinder bracket pivotally supported by the camera independently of the tripod, a focusing finding lens barrel supported thereby having a finding objective therein, a viewfinder housing detachably supported by the bracket, an optical system supported therein for enlarging the image projected by the finder objective into the viewfinder housing, and actuating devices supported by the camera and the viewfinder bracket, for effecting simultaneous movement of the photographing and finding lens barrel and also simultaneously displacing the viewfinder bracket with respect to the camera body whereby the axes of the photographic and finder objectives will intersect at the point of sharp focus thereof as the objectives are focused on a subject to be photographically recorded by the camera.

5. In combination with a camera adjustably supported by a tripod head or similar mount, the camera having a photographing lens supported thereby and a view-finder hinged to the camera body independently of the tripod, the view-finder having a finding lens supported thereby, of means for simultaneously focusing the photographic and finder lenses and displacing the finder angularly with respect to the camera body whereby the axes of the lenses will intersect at the point of sharp focus thereof.

6. In combination with a camera adjustably supported on a tripod head or similar mounting, the camera having a focusing photographic lens barrel supporting a photographic objective therein, of a view-finder unit, a focusing finding lens barrel supported thereby having a viewfinding objective supported therein, hinge members supported by the camera, hinge members supported by the view-finder unit, an intermediate hinge member interposed between the camera hinge member and the view-finder hinge member and hinged thereto to form a double hinge connection between the camera and the view-finder, a rotating member supported by the intermediate member arranged to effect simultaneous movement of the lens barrels if one or the other is rotated, and actuating devices controlled by the movement of the rotating member for effecting hinged movement of the view-finder relative to the intermediate member and simultaneously effect hinged movement of the intermediate member relative to the camera body whereby the axes of the objectives will intersect at the point of sharp focus thereof as they are focused on a subject to be photographically recorded by the camera.

7. In combination with a camera adjustably supported on a tripod head or similar mounting, the camera supporting a focusing photographic lens barrel having a photographic objective supported therein, of a view-finder unit, a focusing finding lens barrel supported thereby having a view-finding objective supported therein, a hinge member jointly supported by the camera body and view-finder unit arranged to pivotally attach the view-finder unit to the camera body, a rotating member supported thereby arranged to engage both lens barrels whereby rotation of one of the barrels will produce a similar rotation of the other barrel, a gear sector secured to the camera body, a gear sector secured to the view-finder body, and a worm actuated by movement of the rotating member positioned to engage both the gear sectors whereby rotation thereof will displace the view-finder unit angularly with respect to the camera body simultaneously with rotation of the lens barrels.

8. In combination with a camera adjustably supported on a tripod head or similar mounting, the camera supporting a focusing photographic lens barrel having a photographic objective supported therein, of a view-finder unit, a focusing finding lens barrel supported thereby having a finding objective supported therein, the forward end of the view-finding unit being pivotally supported by the camera body independently of the tripod, of means for moving the rear end of the view-finder unit towards and away from the camera body and simultaneously moving both lenses forwardly and rearwardly whereby the axes of the lenses are caused to intersect at the point of sharp focus thereof.

9. The combination with a camera having a photographic lens adjustably supported thereby arranged to be focused upon a subject, of a view finder pivotally supported with respect to the camera, the view finder having a view finding lens adjustably supported thereby also arranged to be focused upon the subject, and means for simultaneously focusing the photographic and finder lenses and simultaneously pivotally displacing the view finder angularly with respect to the camera whereby the axes of the lenses will intersect at the point of substantially sharp focus thereof without displacing the camera angularly with respect to the subject.

10. The combination with a camera having a photographic lens adjustably supported thereby arranged to be focussed upon a subject, of a view finder pivotally supported with respect to the camera, the view finder having a view-finding lens adjustably supported thereby also arranged to be focussed upon the subject, and means for focussing the photographing and finder lenses simultaneously and simultaneously solely pivotally displacing the view finder angularly with respect to the camera whereby the axes of the lenses will intersect at the point of substantially sharp focus thereof without displacing the camera angularly with respect to the subject focussed upon.

11. The combination with a camera having a photographic lens adjustably supported thereby arranged to be focussed upon a subject, of a view finder pivotally supported with respect to the camera, the view finder having a view finding lens adjustably supported thereby also arranged to be focussed upon the subject, and means for focussing the photographing and finding lenses simultaneously and also simultaneously solely displacing the view finder angularly with respect to the camera without displacing the camera angularly from the subject being focussed upon by the lenses.

12. In combination, a camera, a photographic lens barrel adjustably supported with respect to the forward portion of the camera body, the lens barrel having a photographic lens therein for focussing on a subject, a view finder movably supported with respect to the camera, a view finder lens barrel adjustably supported with respect to the forward portion of the view finder body, the view finder lens barrel having a view finding lens therein for also focussing on the subject, and means including gearing operately connecting the photographic lens barrel, the view finder lens barrel and the view finder body for simultaneously adjustably positioning the photographic lens barrel and the view finder lens barrel for focussing the photographic and view finding lenses on the subject and simultaneously angularly displacing the view finder with respect to the camera whereby the axes of the lenses will intersect at the point of substantially sharp focus thereof.

13. In combination, a camera, a photographic lens rotatively supported with respect to the forward end of the camera body, a view finder movably supported with respect to the camera, a viewfinder lens rotatively supported with respect to the forward end of the finder body, and means including gearing operatively connecting the photographic lens, the view finder lens and the view finder body for simultaneously rotating the photographic and view finder lenses for focussing on a subject and simultaneously displacing the view finder with respect to the camera whereby the axes of the lenses will intersect at the point of substantially sharp focus thereof.

14. The combination with a camera having a photographic lens adjustably supported thereby for focussing upon a subject, of a view finder arranged to be angularly displaced with respect to the camera, the view finder having a view finder lens adjustably supported thereby for also focussing upon the subject, and means for simultaneously adjustably positioning the photographic and view finder lenses for focussing on the subject and simultaneously angularly displacing the view finder with respect to the camera whereby the axes of the lenses will intersect at the point of substantially sharp focus, the view finder being angularly displaced with respect to the camera without angularly displacing the camera with respect to the subject.

In testimony whereof, OSCAR A. ROSS has signed his name to this specification this 17th day of May, 1927.

OSCAR A. ROSS.